United States Patent
Krishnamoorthy (10) Patent No.: US 7,398,264 B2
(45) Date of Patent: Jul. 8, 2008

(54) SIMPLIFYING MOVEMENT OF DATA TO DIFFERENT DESIRED STORAGE PORTIONS DEPENDING ON THE STATE OF THE CORRESPONDING TRANSACTION

(75) Inventor: Karthick Krishnamoorthy, Chennai (IN)

(73) Assignee: Oracle International Corporation, Redwood Shores, CA (US)

( * ) Notice: Subject to any disclaimer, the term of this patent is extended or adjusted under 35 U.S.C. 154(b) by 354 days.

(21) Appl. No.: 10/905,696

(22) Filed: Jan. 17, 2005

(65) Prior Publication Data

US 2006/0161589 A1    Jul. 20, 2006

(51) Int. Cl.
G06F 17/30 (2006.01)
G06F 7/00 (2006.01)
G06F 17/00 (2006.01)

(52) U.S. Cl. .................. 707/1; 707/3; 707/10; 707/100
(58) Field of Classification Search .................... 707/10, 707/1, 100, 3
See application file for complete search history.

(56) References Cited

U.S. PATENT DOCUMENTS

| | | | | |
|---|---|---|---|---|
| 5,826,270 A * | 10/1998 | Rutkowski et al. | ............ | 707/10 |
| 6,430,562 B1 * | 8/2002 | Kardos et al. | ................. | 707/10 |
| 6,466,937 B1 * | 10/2002 | Fascenda | ..................... | 707/10 |
| 6,625,598 B1 * | 9/2003 | Kraffert | ......................... | 707/3 |
| 6,684,222 B1 * | 1/2004 | Cornelius et al. | ......... | 707/104.1 |
| 7,184,973 B2 * | 2/2007 | Monteleone et al. | .......... | 705/26 |
| 2002/0046130 A1 * | 4/2002 | Monteleone et al. | .......... | 705/26 |
| 2002/0103900 A1 * | 8/2002 | Cornelius et al. | ............. | 709/224 |
| 2003/0115073 A1 * | 6/2003 | Todd et al. | ..................... | 705/1 |
| 2004/0044959 A1 * | 3/2004 | Shanmugasundaram et al. | .......................... | 715/513 |
| 2005/0010896 A1 * | 1/2005 | Meliksetian et al. | ........ | 717/106 |
| 2005/0120039 A1 * | 6/2005 | Amys et al. | ................. | 707/102 |
| 2006/0200499 A1 * | 9/2006 | Bhatia et al. | ................ | 707/200 |

OTHER PUBLICATIONS

Siu Chang and Clara Jaeckel; "Oracle Workflow" from the User's Guide, Release 2.6.3, Part No. B10285-02; pp. 1-136; Sep. 2003; Oracle Corporation, Redwood City, CA.

* cited by examiner

*Primary Examiner*—Don Wong
*Assistant Examiner*—Thanh-Ha Dang
(74) *Attorney, Agent, or Firm*—Narendra Reddy Thappeta (57) ABSTRACT

A user may merely need to specify various states of transactions and actions to be performed upon reaching a state for the corresponding transaction, and a front end block may automatically perform an action when the corresponding state is reached. Each action may indicate any necessary movement of data to a new storage portion. As a result, a programmer can be shielded from various details (e.g., which database to store the data in, data format conversions) in (developing the code for) processing the transactions.

20 Claims, 6 Drawing Sheets

| State | Target | Table | Operation | Rule |
|---|---|---|---|---|
| Order_Received | 150A | Order_Table | Insert | If(Order_Date>12/12/2000) Order_Price+Order_Price-(Order_Price*20)/100 |
| Order_PrimaryCheck | 150A | Order_Table | Update | If(Order_Qty)>10 (Insert into Order_Premium values(Order_Number,Order_Qty)) |
| Order_Reject | 150A | Order_Table | Update | Insert into audit_order (select* from order_table where virt1.order_num+order_num) Call delete_workitem(order_num) |
| Order_Process | 150A | Order_Table | Update | none |
| Order_StartProcess | 150B | Order_Table | Update | Call delete 150A (order_num) |
| Order_OnHold | 150B | Order_Table | Update | none |
| Order_Release | 150B | Order_Table | Update | none |
| Order_Valid | 150B | Order_Table | Update | none |
| Order_Payment | 150C | Order_Table | Update | Call delete 150B (order_num) |
| Order_Shipment | 150C | Order_Table | Update | none |
| Order_Closed | 150C | Order_Table | Update | none |
| Order_Passive | 150C | Order_Table | Update | none |

FIG. 3C

| Simplified Query | Modified Query | Additional Query |
|---|---|---|
| Insert into order-table values (999, 12-13-2000, Standard, 54, 25, 'order-received') | Insert into 150A.order-table values (999, 12-13-2000, Standard, 54, 25, 'order-received') | Update 150A.order-table set order-table.order-price = order-table.order-price - (20 * order-table.order-price/100) |
| Update order-table set order-state = 'order-primaryCheck' where order-number = 999 | Update 150A.order-table set order-table.order-state = 'order-primaryCheck' where order-table.order-number = 999 | Insert into 150A.order-premium values (999, 25) |
| Update order-table set order-state = 'order-startProcess' where order-number = 999 | Update 150B.order-table set order-table.order-state = 'order-startProcess' where order-table.order-number = 999 | Delete from 150A.order-table where order-table.order-number = 999 |
| Update order-table set order-state = 'order-payment' where order-number = 999 | Update real.order_table set object_value=updateXML(Object_value,/order/order_status/text()),order_status) where real.order_num = order_num | Delete from 150B.order-table where order-table.order-number = 999 |

SIMPLIFYING MOVEMENT OF DATA TO DIFFERENT DESIRED STORAGE PORTIONS DEPENDING ON THE STATE OF THE CORRESPONDING TRANSACTION

BACKGROUND OF THE INVENTION

1. Field of the Invention

The present invention relates to database systems, and more specifically to a method and apparatus for simplifying movement of data to different desired storage portions depending on the state of the corresponding transaction.

2. Related Art

Data is often maintained and stored to support corresponding transactions. For example, in an order processing system, data is stored to indicate whether a corresponding order (example of a transaction) has been processed, placed on hold, or awaiting payment, etc. Often the data is stored in databases to facilitate structured querying and storage, as is well known in the relevant arts.

There is a recognised need to move data from one storage portion to anther depending on the state of the corresponding transaction. For example, different storage portions may have different levels of physical security, backup (duplication) facilities, etc., and it be desirable to store more critical data in areas with higher security and with more backup facilities.

In the case of databases, the data related to a transaction may be moved to different databases or tables. As an illustration, once a sale is complete, the data may be moved to another database which is owned or operated by a different business group (e.g., finance). On the other hand, data may be moved to different tables for example due to the organization of different columns of data in different relational database tables.

In one prior approach associated with database systems, a programmer drafts specific pieces of code to move the data to different portions in each type of situation, according to the design requirements. The specific pieces of code may be embedded within the applications. Alternatively, in an approach referred to as 'triggers', specific pieces of code are executed upon occurrence of specified events, which again achieve the movement objective.

Unfortunately, in such approaches, the burden of developing the specific pieces of code is with programmers, and may be unacceptable at least in some circumstances. What is therefore needed is a a method and apparatus for simplifying movement of data to different desired storage portions depending on the state of the corresponding transaction.

BRIEF DESCRIPTION OF THE DRAWINGS

The present invention will be described with reference to the accompanying drawings briefly described below.

FIG. (FIG.) 1 is a block diagram of an example environment in which various aspects of the present invention can be implemented.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

According to an aspect of the present invention, a user may merely need to specify various states of transactions and actions to be performed upon reaching a state for the corresponding transaction, and a front end block may automatically perform an action when the corresponding state is reached. Each action may indicate any necessary movement of data to a new storage portion. As a result, a programmer can be shielded from various details (e.g., which database to store the data in) in (developing the code for) processing the transactions.

According to another aspect of the present invention, the front end block modifies the queries automatically to conform the data (to be stored) to the data format of the target storage portion in which the data is to be stored. As a result, the programmer may be shielded from additional details related to differences in data formats as well.

Various aspects of the present invention are described below with reference to an example problem. Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well_known structures or operations are not shown in detail to avoid obscuring the features of the invention.

2. Example Environment

Figure 1:
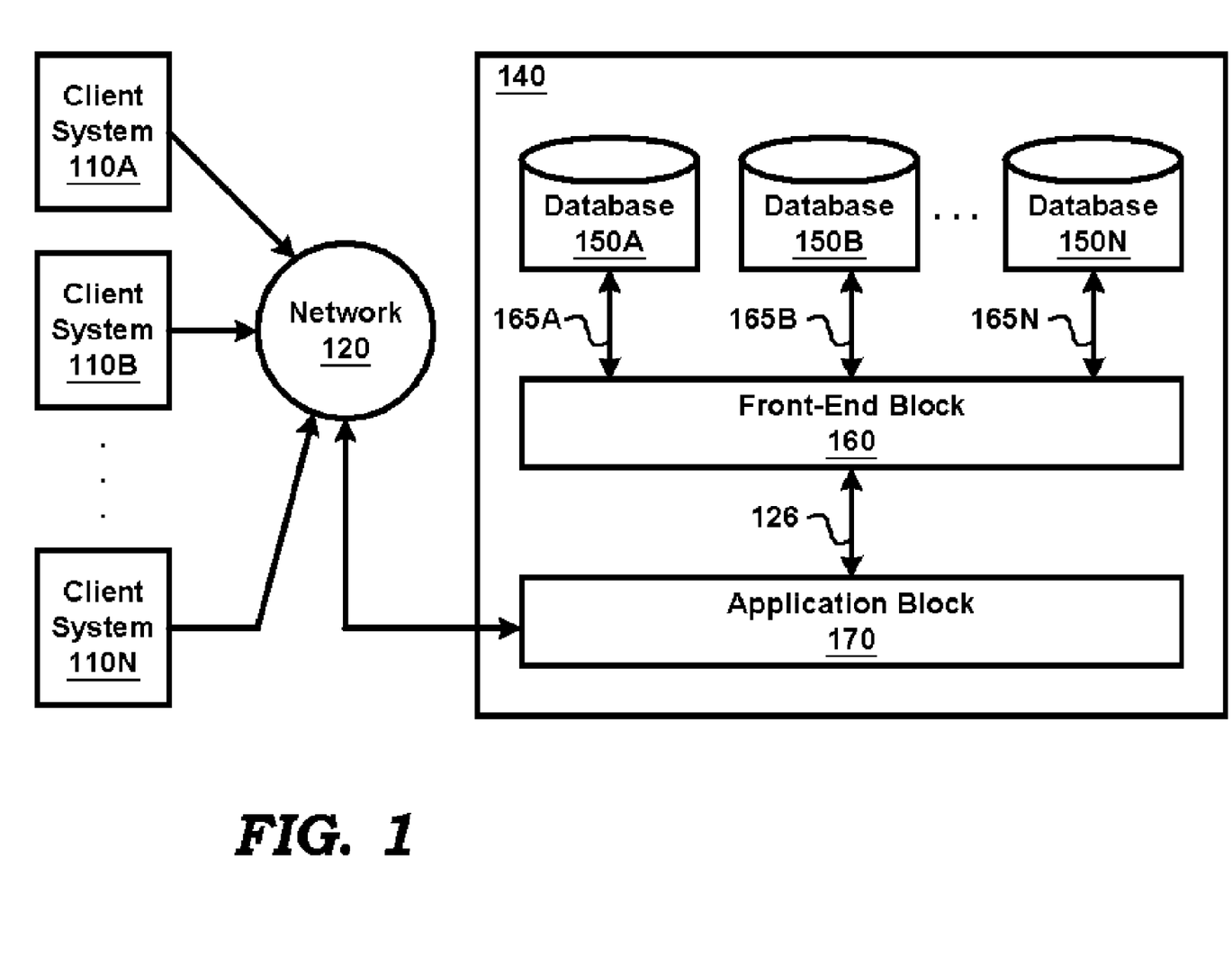

FIG. 1 is a block diagram illustrating an example environment in which various aspects of the present invention can be implemented. The environment is shown containing client systems 110A-110N, network 120, and server system 140 in turn containing databases 150A-150N, front-end block 160, and application block 170. Each system/block is described below in further detail.

Network 120 provides the connectivity between client systems 110A-110N and server system 140. Client systems 110A-110N enable users to conduct various transactions, and client systems 110A-110N exchange data with server system 140 to support the transactions.

Databases 150A-150N represent different storage portions, and enable data to be stored and retrieved using structured queries (e.g., compatible with SQL, well known in the relevant arts). In general, each database contains one or more tables according to corresponding schemas, and data in the table is accessed (read/write) using structured queries. Access to the tables is enabled by opening the database.

Application block 170 receives data from client systems 110A-110N, and generates various queries to databases 150A-150N. Front-end block 160 receives the queries and interfaces with databases 150A-150N to perform the desired actions. Front-end block 160 simplifies the implementation logic of application block 170 at least with respect to movement of data between databases 150A-150N, as described below in further detail.

3. Flow-Chart

Figure 2:
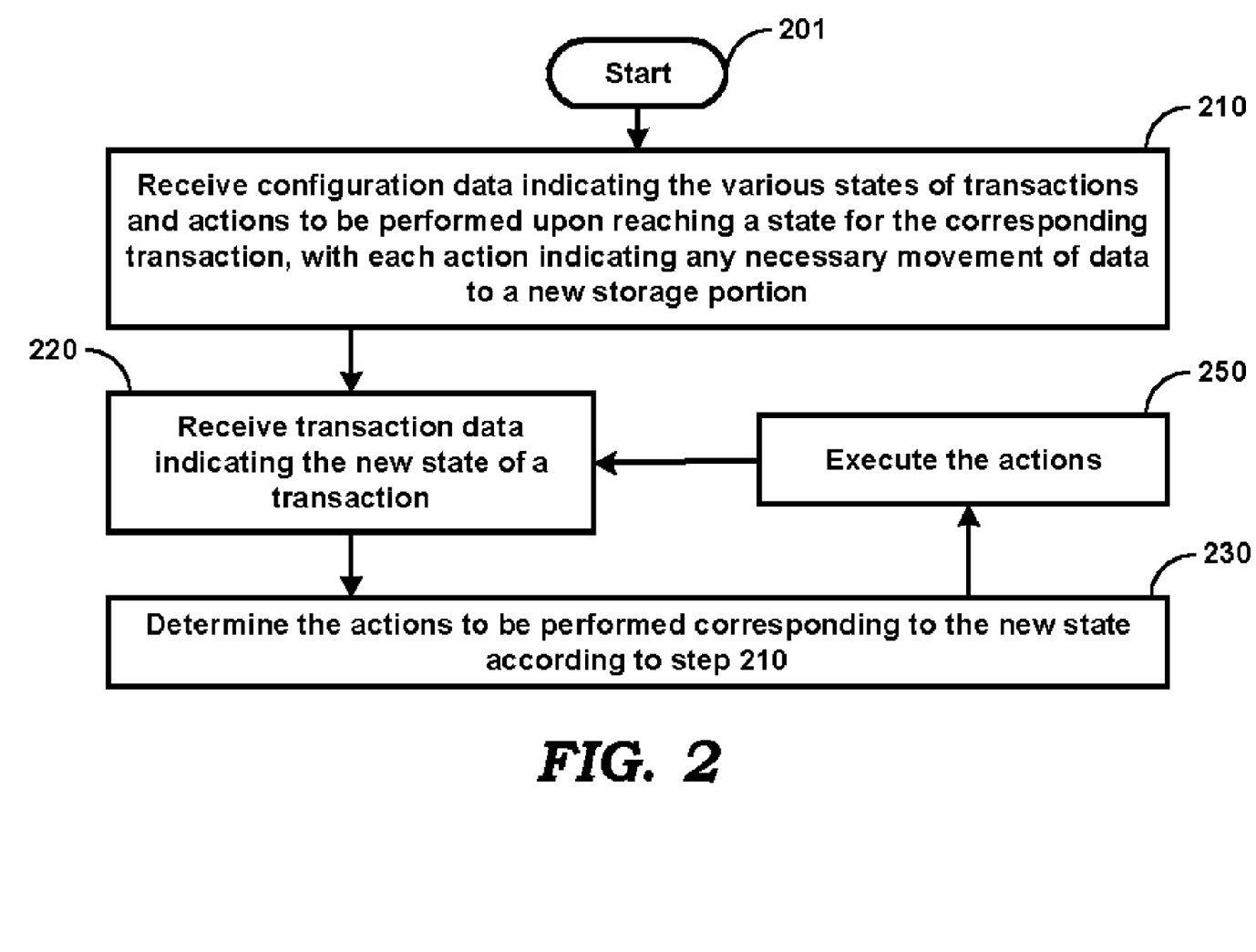
FIG. 2 is a flow chart illustrating the manner in which a front-end block may simply implementation of movement of data portions across databases in an embodiment of the present invention.

FIG. 2 is a flow-chart illustrating the manner in which a front-end block may operate according to an aspect of the present invention. The flow chart is described with reference to FIG. 1 merely for illustration. However, the features can be implemented in other environments/systems as well. The flow chart begins in step 201, in which control immediately passes to step 210.

In step 210, front-end block 160 receives configuration data indicating the various states of transactions and actions to be performed upon reaching a state for the corresponding transaction. The actions associated with (transition to) each state indicate any necessary movement of data to a new storage portion.

In step 220, front-end block 160 receives from application block 170 transaction data indicating the new state of a transaction. Application block 170 may in turn have generated such data in response to data received from client system 110A. For example, when an order is shipped and the corresponding data is entered by a user using client system 110A, application block 170 may send to front-end block 160 data indicating the new state of the transaction.

In step 230, front-end block 160 determines the action to be performed corresponding to the new state according to step 210. In step 250, front-end block 160 executes the corresponding actions. Thus, the data indicated in step 210 determines the actions (including movement of data to different storage portions and any necessary conversion of data formats) which are performed. Control then passes to step 220.

From the above, it may be appreciated that a programmer simply needs to specify the actions of step 210, and front-end block 160 can be designed to automatically execute the actions. The manner in which the actions can be specified and the manner in which front-end block 160 can be implemented is described below in further detail.

4. Specifying States and Associated Desired Actions

Figure 3A:
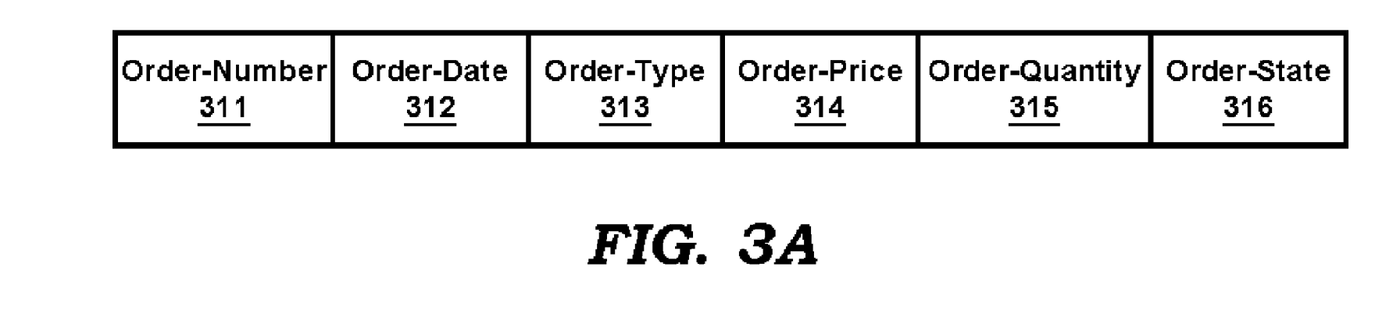
FIG. 3A contains a table schema used to illustrate example operations in an embodiment of the present invention.
Figure 3B:
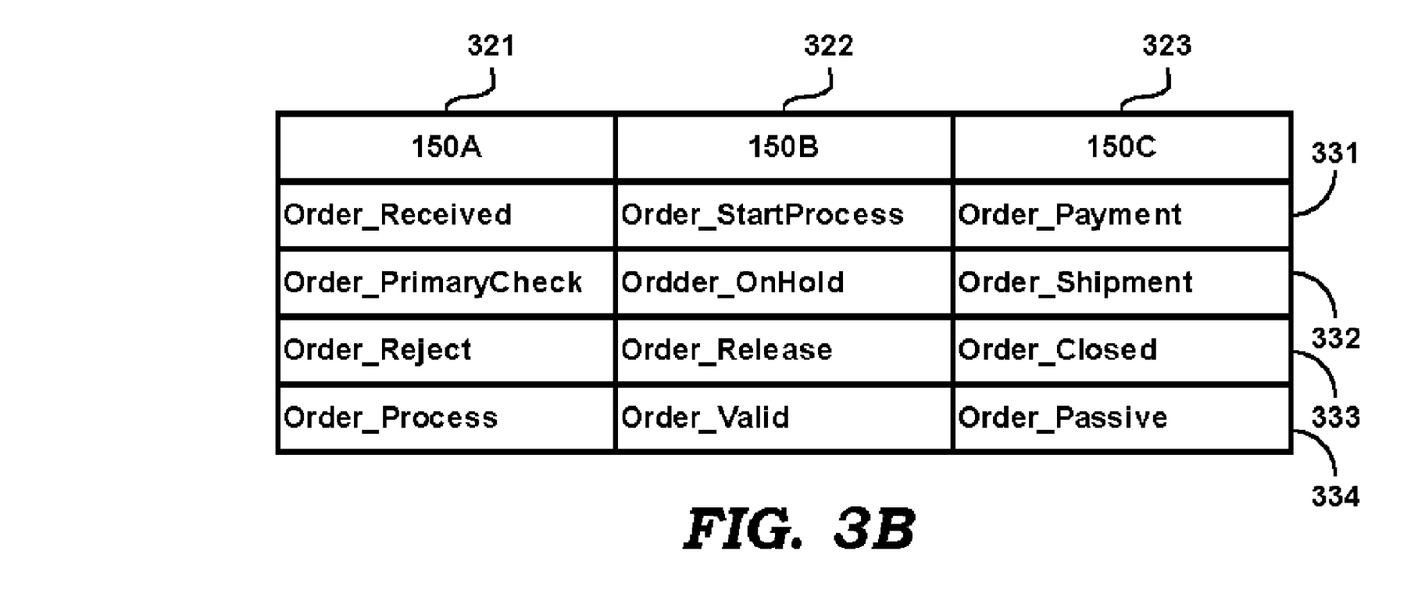
FIG. 3B illustrates the various states of a transaction and the target databases in which the data related to the transaction is to be stored in an embodiment of the present invention.
Figure 3C:
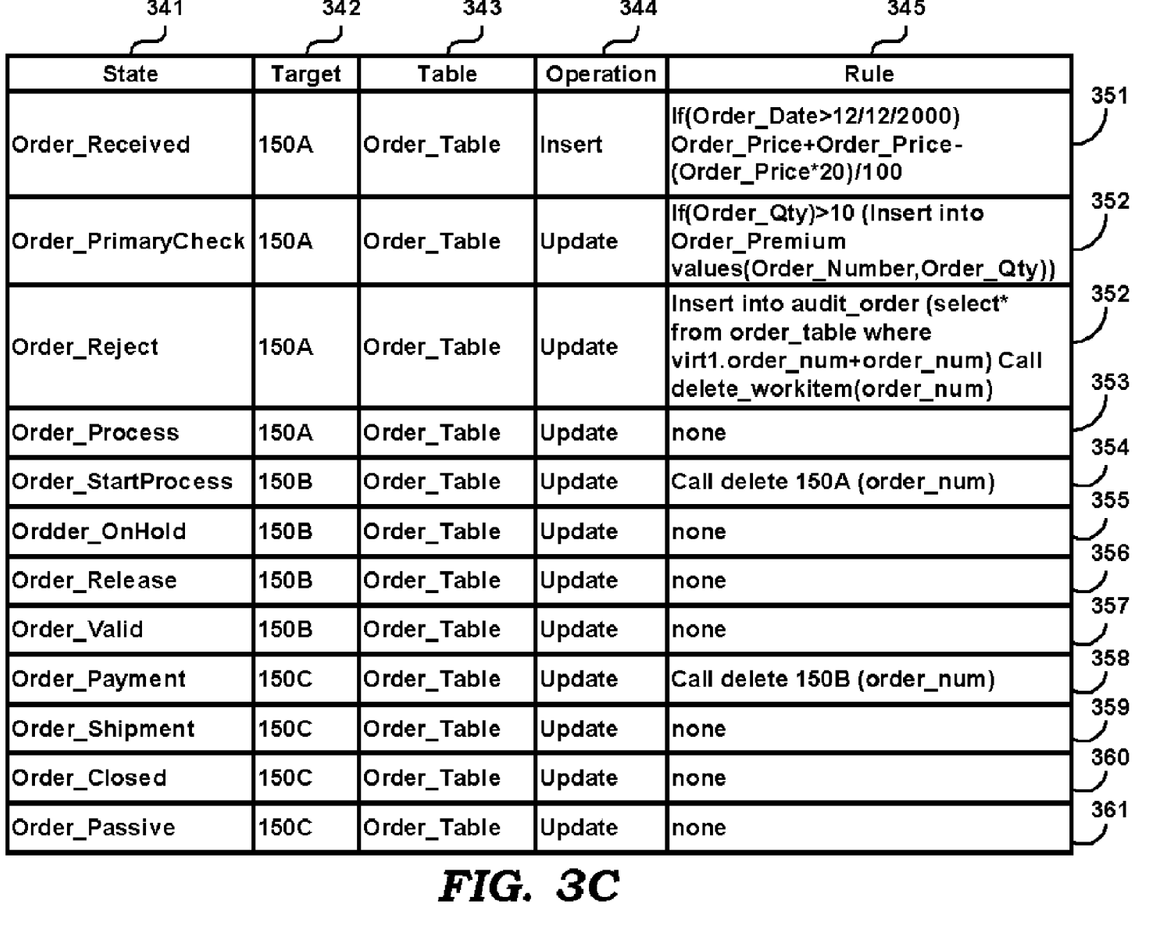
FIG. 3C illustrates the manner in which a user may specify different data portions to which data is to be moved in an embodiment of the present invention.

FIGS. 3A-3C together illustrate the manner in which states and desired associated actions may be specified in an embodiment of the present invention. In particular, FIG. 3A contains an example table structure used to support transactions in an order processing system, FIG. 3B contains the various states that a transaction may go through, and FIG. 3C indicates the desired movement to different data portions as a transaction progresses through different states. Each Figure is described below in further detail.

With respect to FIG. 3A, there is a shown a table containing columns order-number 311, order-date 312, order-type 313, order-price 314, order-quantity 315 and order-state 316. The columns are not described in detail (except as needed for understanding the features of the present invention) as being self-explanatory. Order-state 316 can have several values (states) as described below with respect to FIG. 3B.

FIG. 3B indicates the various possible states of a transaction, and the database (data portion) in which the data related to the transaction is to be stored corresponding to each state. The table contains three columns 321-323, and four rows 331-334. As shown in column 321, the data needs to be in database 150A when/if a transaction is in one of {order-received, order-primaryCheck, order-reject and order-process} states, in database 150B when/if a transaction is in one of {order-startProcess, order-onHold, order-release, order-valid} states, and database 150C when/if the transaction is in one of {order-payment, order-shipment, order-closed, order-passive} states.

The sequence of states in which a transaction goes through in normal course is shown row-wise from top to down, and then to then column wise from left to right. Thus, the sequence of states is: order-received, order-primaryCheck, order-reject and order-process, order-startProcess, order-onHold, order-release, order-valid, order-payment, order-shipment, order-closed, and order-passive in that order. From the above noted understanding of the data movement requirements, a user may specify the actions as shown below with respect to FIG. 3C.

FIG. 3C contains a table indicating the actions to be performed if/when a transaction reaches each state of interest. The table is shown containing five columns—order-state 341, target-database 342, table 343, operation 344 and rule 345, and twelve rows 351-362. The columns and rows are described below in further detail.

Order-state 341 indicates the state (or entry into that state) at which the corresponding actions are to be performed. Target-database 342 indicates the specific database to which the data is to be moved. Table column 343 indicates the table to which the updated data is to be moved. Operation 344 specifies the specific action to be performed on table 343, and rule 345 specifies any additional actions which may need to be performed corresponding to the state.

Row 351 indicates that the data is to be 'inserted' into a table entitled order-table within database 150A (column 342). This implies that a new transaction is received and thus a new row is being inserted into the table, as specified. In addition, rule 345 indicates that a discount of 20% is to be given if order-date is later than Dec. 12, 2000.

Row 352 indicates that data is to be stored in database 150A if the order state equals Order-primaryCheck, and the row in order-Table table is to be updated. In addition, rule 345 indicates that a row is inserted into another table Order-premium of database 150A, with the values corresponding to order-number and order-quantity. Rows 353 and 354 also indicate that the data is to be stored in database 150A if the order state respectively equals order-reject and order-process. In addition, in row 354, given the target column 342 and table column 343 respectively indicate '150C' and 'Order-table', the data received with the update operation is stored in order-table of database 150C.

Rows 355, 356, 357 and 358 indicate that data is to be stored in database 150B when/if the status of the transaction is in one of order-startProcess, order-onHold, order-release, order-valid states respectively. Row 355 indicates in addition that the row corresponding to order-number is to be deleted from database 150A (which in effect amounts to a move, along with the insert operation).

Rows 359, 360, 361 and 362 indicate that the data is to be stored inbase 150C when/if the transaction is in one of order-payment, order-shipment, order-closed, and order-passive states respectively. Row 359 indicates in addition that the row corresponding to order-number is to be deleted from database 150B. Thus, the transaction details are eventually present only in database 150C.

Front-end block 160 may receive queries without various details already specified in the table of FIG. 3C, and yet provide the desired functionality as described below with respect to FIG. 4.

5. Query Processing

Figure 4:
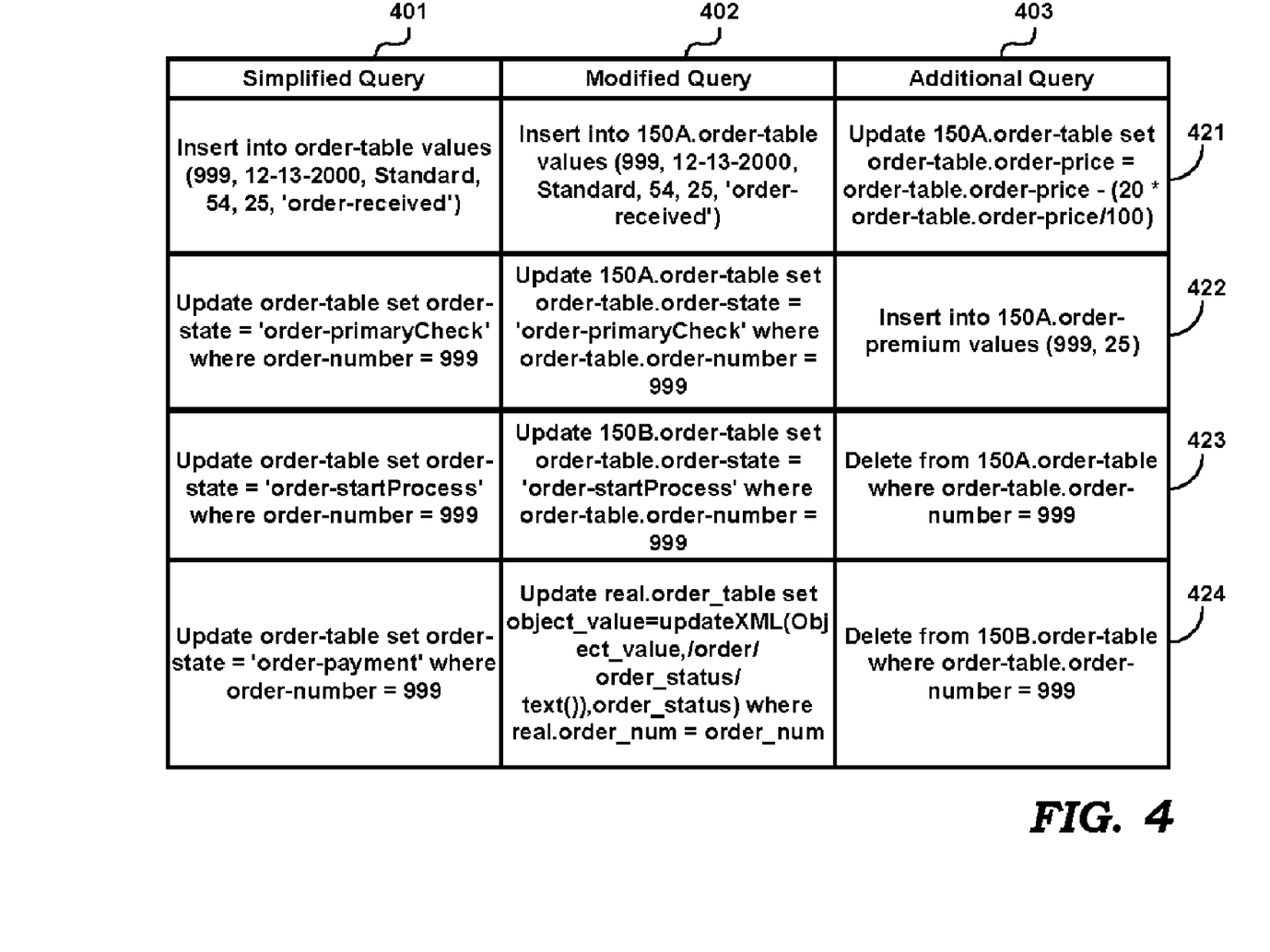
FIG. 4 contains a table illustrating a simplified query which may be generated by an application block implemented by users and the corresponding modified query and additional queries generated by a front-end block in an embodiment of the present invention.

FIG. 4 contains a table indicating query processing by using the table described above with respect to FIG. 3C. The table is shown containing three columns simplified query 401, modified query 402 and additional query 403. The entries in simplified query 401 are generated by application block 170, and the corresponding entries in modified query 402 and additional query 403 are generated by front-end block 160 using the information present in FIG. 3C. Each row 421-424 is described below in further detail.

Row 421 contains a simplified query {Insert into order-table values (999, 12-13-2000, Standard, 54, 25, 'order-received')} indicating that a row is to be created with values of 999, 12-13-2000, Standard, 54, 25, 'order-received' for columns order-number 311, order-date 312, order-type 313, order-price 314, order-quantity 315 and order-state 316 respectively. It may be appreciated that various details such as the specific database is not specified by the simplified query.

The corresponding modified query reads {Insert into 150A.order_table values (999, 12_13_2000, Standard, 54, 25, 'order_received')}, filling some of the information from the table of FIG. 3C. The information is filled using the information in row 351 based on the matching value of order-state. An additional query {Update 150A.order_table set order_table.order_price=order_table.order_price−(20*order_table.order_price/100)} is also generated corresponding to the rule specified in row 351.

Row 422 contains a simplified query {Update order_table set order_state='order_primaryCheck' where order_number=999}. Front-end block 160 determines that row 352 is the matching row for the order status, and generates a modified query which reads {Update 150A.order_table set order_table.order_state='order_primaryCheck' where order_table.order_number=999} and an additional query which reads {Insert into 150A.order_premium values (999, 25)}. It is assumed that the additional query is executed after the modified query in every case.

Row 423 contains a simplified query {Update order_table set order_state='order_startProcess' where order_number=999}. The matching row 355 indicates that a target database of 150B is to be used for the update operation. Accordingly, application block 170 generates a modified query of {Update 150B.order_table set order_table.order_state='order_startProcess' where order_table.order_number=999}, and an additional query of {Delete from 150A.order_table where order_table.order_number=999}.

Front-end block 160 sends the modified query and the additional query corresponding to each simplified to the specific database specified in each query. As may be appreciated from the above, the implementation of application block 170 is simplified since some of the database identifier details are not needed, and routine operations such deletions and special cases (discounts) can be set as rules.

Row 424 illustrates additional simplifications which may be obtained in implementation of application block 170. In several instances, the data formats used to store the same information is different in different databases. The modified query of row 424 is generated on the assumption that database 150C stores data in XML format, while the data presented by application block 170 is in some other format (e.g., char, varchar, date). The difference in format may also be specified in the table of FIG. 3C (not shown), and the modified query can be generated as shown. The implementation of application block 170 is simplified further due to the feature.

While the above examples are illustrated with respect to moving data to different databases, it should be understood that data can potentially be moved to different tables within the same database by appropriate modifications to the table of FIG. 3C. It should be further appreciated that the features described above can be implemented in various embodiments. The description is continued with respect to an embodiment in which various features are operative when software instructions are executed.

6. Digital Processing System

Figure 5:
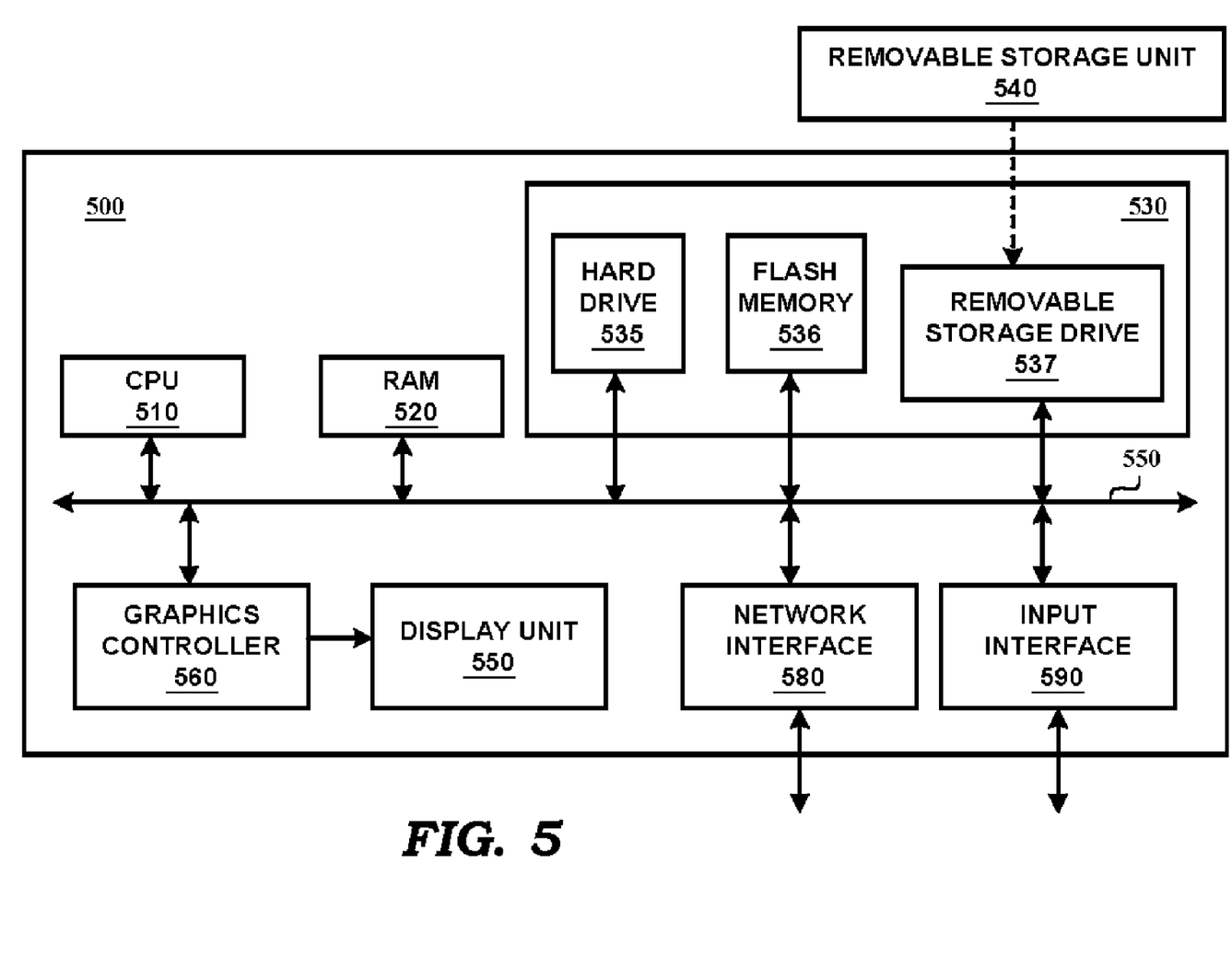
FIG. 5 is a block diagram illustrating an example embodiment in which various aspects of the present invention are operative when software instructions are executed.

FIG. 5 is a block diagram illustrating the details of digital processing system 500 in which various aspects of the present invention are operative by execution of appropriate software instructions. System 500 may correspond to server system 140. System 500 may contain one or more processors such as central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. CPU 510 may contain multiple processing units, with each processing unit potentially being designed for a specific task. Alternatively, CPU 510 may contain only a single general purpose processing unit. RAM 520 may receive instructions from secondary memory 530 using communication path 550.

Graphics controller 560 generates display signals (e.g., in RGB format) to display unit 570 based on data/instructions received from CPU 510. Display unit 570 contains a display screen to display the images defined by the display signals. Input interface 590 may correspond to a key_board and/or mouse. Network interface 580 provides connectivity to a network (e.g., using Internet Protocol), and may be used to communicate with client systems 110A-110N.

Secondary memory 530 may contain hard drive 535, flash memory 536 and removable storage drive 537. Secondary memory 530 may store the data and software instructions (e.g., methods instantiated by each of client system), which enable system 500 to provide several features in accordance with the present invention. Some or all of the data and instructions may be provided on removable storage unit 540, and the data and instructions may be read and provided by removable storage drive 537 to CPU 510. Floppy drive, magnetic tape drive, CD_ROM drive, DVD Drive, Flash memory, removable memory chip (PCMCIA Card, EPROM) are examples of such removable storage drive 537.

Removable storage unit 540 may be implemented using medium and storage format
compatible with removable storage drive 537 such that removable storage drive 537 can read
the data and instructions. Thus, removable storage unit 540 includes a computer readable storage medium having stored therein computer software and/or data.

In this document, the term "computer program product" is used to generally refer to removable storage unit 540 or hard disk installed in hard drive 535. These computer program products are means for providing software to system 500. CPU 510 may retrieve the software instructions, and execute the instructions to provide various features of the present invention described above.

7. Conclusion

While various embodiments of the present invention have been described above, it should be understood that they have been presented by way of example only, and not limitation.

Thus, the breadth and scope of the present invention should not be limited by any of the above described exemplary embodiments, but should be defined only in accordance with the following claims and their equivalents.

What is claimed is:

1. A method to simplify a programmer's task of maintaining data in a plurality of databases depending on the state of the corresponding transaction, wherein each database is designed to facilitate structured queries and storage, said method comprising:
    storing data related to a first transaction in a first database;
    receiving a configuration data indicating one or more actions associated with each of a plurality of states of said first transaction, wherein said plurality of states includes a new state and wherein a set of actions associated with said new state indicates a move action of said data related to said first transaction to a second database, wherein said first database and said second database are contained in said plurality of databases;
    receiving a database query indicating said new state of said first transaction;
    determining said move action corresponding to said new state in said database query by examining said configuration data;
    forming a first query directed to said first database and a second query directed to said second database based on said determining; and
    executing said first query and said second query to move said data from said first database to said second database in response to said determining of said move action,
    wherein said determining, said forming and said executing are performed in response to said receiving of said database query.

2. The method of claim 1, wherein said database query does not indicate a database to which said database query is directed to, and said forming forms said first query and said second query respectively directed to said first database and said second database based on said configuration data, whereby said database query need not specify either database such that said programmer can develop code with a view of a single database even though data related to said first transaction is stored in different databases in different states.

3. The method of claim 2, wherein said configuration data comprises a table containing columns specifying a state, a database for storing the data related to the transaction and a rule, wherein said rule contains said first query,
    wherein said forming forms said first query from said rule column in a first row of said table, wherein said state column of said first row matches said new state.

4. The method of claim 3, wherein said first database stores a portion of said first transaction according to a first format and said second database stores said portion according to a second format, said method further comprising converting said portion from said first format to said second format automatically such that said programmer is relieved of conversion task.

5. The method of claim 4, wherein said second format comprises eXtended Meta Language (XML).

6. The method of claim 4, wherein said first transaction is related to order processing, wherein said new state equals one of an order start process state and an order payment state.

7. The method of claim 4, wherein said forming forms said second query by incorporating the value in said database column in said first row into said database query, wherein said database query is a structured query compatible with Structured Query Language (SQL).

8. The method of claim 1, wherein each of said first query and said second query comprises a corresponding structured query compatible with Structured Query Language (SQL).

9. A computer readable storage medium carrying one or more sequences of instructions causing a digital processing system to simplify a programmer's task of maintaining data in a plurality of databases, wherein each database is designed to facilitate structured queries and storage, wherein execution of said one or more sequences of instructions by one or more processors contained in said digital processing system causes said digital processing system to perform the actions of:
    storing data related to a first transaction in a first database, said first transaction having one of a plurality of states, and wherein said data is stored in said first database when said first transaction is in a first state;
    receiving a configuration data indicating one or more actions associated with each of said plurality of states of said first transaction, wherein said plurality of states includes a new state and wherein a set of actions associated with said new state indicates a store action of new data related to said first transaction in a second database, wherein said first database and said second database are contained in said plurality of databases;
    receiving a database query indicating said new state of said first transaction and a corresponding new data;
    determining said store action corresponding to said new state in said database query by examining said configuration data;
    forming a first query directed to said second database based on said determining; and
    executing said first query to store said new data in said second database,
    wherein said determining, said forming and said executing are performed in response to said receiving of said database query.

10. The computer readable storage medium of claim 9, wherein said database query does not indicate a database to which said database query is directed to, and said forming forms said first query directed to said second database based on said configuration data, whereby said database query need not specify either database such that said programmer can develop code with a view of a single database even though data related to said first transaction is stored in different databases in different states.

11. The computer readable storage medium of claim 10, wherein said configuration data comprises a table containing columns specifying a state, a database for storing the data related to the transaction and a rule, wherein said rule contains a second query designed to remove said data from said first database,
    wherein said forming forms said second query from said rule column in a first row of said table, wherein said state column of said first row matches said new state,
    wherein said executing executes said second query to remove said data from said first database, thereby causing movement of data related to said first transaction from said first database to said second database.

12. The computer readable storage medium of claim 11, wherein said first database stores a portion of said first transaction according to a first format and said second database stores said portion according to a second format, further comprising converting said portion from said first format to said second format automatically such that said programmer is relieved of conversion task.

13. The computer readable storage medium of claim 11, wherein said forming forms said first query by incorporating the value in said database column in said first row into said database query, wherein said database query is a structured query compatible with Structured Query Language (SQL).

14. The computer readable storage medium of claim 9, wherein each of said first query and said second query comprises a corresponding structured query compatible with Structured Query Language (SQL).

15. An apparatus to simplify a programmer's task of maintaining data in a plurality of databases depending on the state of the corresponding transaction, wherein each database is designed to facilitate structured queries and storage, said apparatus comprising:
- means for storing data related to a first transaction in a first database, said first transaction having one of a plurality of states, and wherein said data is stored in said first database when said first transaction is in a first state;
- means for receiving a configuration data indicating one or more actions associated with each of said plurality of states of said first transaction, wherein said plurality of states includes a new state and wherein a set of actions associated with said new state indicates a store action of new data related to said first transaction in a second database, wherein said first database and said second database are contained in said plurality of databases;
- means for receiving a database query indicating said new state of said first transaction and a corresponding new data;
- means for determining said store action corresponding to said new state in said database query by examining said configuration data;
- means for forming a first query directed to said second database based on said determining; and
- means for executing said first query to store said data in said second database,
- wherein said determining, said forming and said executing are performed in response to said receiving of said database query.

16. The apparatus of claim 15, wherein said configuration data comprises a table containing columns specifying a state, a database for storing the data related to the transaction and a rule, wherein said rule contains a second query designed to remove said data from said first database,
- wherein said means for forming forms said second query from said rule column in a first row of said table, wherein said state column of said first row matches said new state, and forms said first query by incorporating the value in said database column in said first row into said database query,
- wherein said means for executing executes said second query to remove said data from said first database, thereby causing movement of data related to said first transaction from said first database to said second database.

17. A computer implemented method to simplify maintenance of data in a plurality of databases depending on the state of the corresponding transaction, wherein each database is designed to facilitate storage in the form of tables and queries using a structured query language (SQL), said method comprising:
- storing data related to a first transaction in a first database, said first transaction having one of a plurality of states, and wherein said data is stored in said first database when said first transaction is in a first state;
- receiving a configuration data specifying a corresponding target database to store said data related to the transaction for each of said plurality of states;
- receiving a database query indicating a new state of said first transaction and a corresponding new data, said database query not indicating a database to which said database query is directed;
- determining a first target database corresponding to said new state by examining said configuration data, wherein said first database and said first target database are contained in said plurality of databases;
- forming a first query directed to said first target database, wherein said first query is generated by incorporating said first target database in said database query;
- executing said first query to store said new data related to said first transaction in said first target database,
- wherein said database query and said first query are according to said SQL,
- wherein said determining, said forming and said executing are performed in response to said receiving of said database query.

18. The method of claim 17, wherein said configuration data specifies a first rule corresponding to said new state indicating a removal action of said data related to said first transaction from said first database,
- wherein said forming forms a second query designed to remove said data from said first database based on said removal action in said first rule in said configuration data,
- wherein said executing executes said second query to remove said data from said first database, thereby causing movement of data related to said first transaction from said first database to said first target database.

19. The method of claim 17, wherein said configuration data specifies a first store action of data related to said first transaction in said first database for a second state of said transaction, wherein said second state is different from said first state,
- wherein said configuration data also specifies a second rule corresponding to said second state, said second rule indicating a second store action of a portion of data related to said first transaction in a second table, wherein said second table is different from a table in which said data is stored when said first transaction is in said first state,
- said method further comprising receiving a second database query indicating said second state of said first transaction, said second database query further indicating a second data for said first transaction, said second database query not indicating a database to which said second database query is directed;
- wherein said forming generates a third query and a fourth query based respectively on said first store action and said second store action, wherein said third query is generated by incorporating said first database in said second database query, wherein said fourth query is generated based on said second rule and is designed to store portion of said second data in said second table;
- wherein said executing executes said third query and said fourth query, wherein execution of said third query stores said second data in said first database and execution of said fourth query stores portion of said second data in said second table.

20. The method of claim 17, wherein said first database is designed to store said data related to said first transaction according to a first format and said first target database is designed to store said new data according to a second format,
- wherein said configuration data indicates a store action of data in said first target database in said second format,
- said method further comprising converting said new data to said second format automatically in response to said store action in said configuration data such that said programmer is relieved of conversion task.

* * * * *

UNITED STATES PATENT AND TRADEMARK OFFICE
CERTIFICATE OF CORRECTION

| | | |
|---|---|---|
| PATENT NO. | : 7,398,264 B2 | Page 1 of 1 |
| APPLICATION NO. | : 10/905696 | |
| DATED | : July 8, 2008 | |
| INVENTOR(S) | : Krishnamoorthy | |

It is certified that error appears in the above-identified patent and that said Letters Patent is hereby corrected as shown below:

On sheet 3 of 6, in Figure 3B, below Ref. Numeral 322, line 3, delete "Ordder_OnHold" and insert -- Order_OnHold --, therefor.

On sheet 4 of 6, in Figure 3C, below Ref. Numeral 341, line 7, delete "Ordder_OnHold" and insert -- Order_OnHold --, therefor.

In column 1, line 47, before "method" delete "a".

In column 1, line 55, after "FIG." delete "(FIG.)".

In column 7, line 63, in claim 7, delete "claim 4," and insert -- claim 3, --, therefor.

Signed and Sealed this

Seventeenth Day of November, 2009

David J. Kappos
*Director of the United States Patent and Trademark Office*